(12) United States Patent
Moore et al.

(10) Patent No.: US 11,025,104 B2
(45) Date of Patent: Jun. 1, 2021

(54) ELECTRIC MACHINE

(71) Applicant: General Electric Company, Schenectady, NY (US)

(72) Inventors: Nicholas Taylor Moore, Cincinnati, OH (US); Daniel Alan Niergarth, Norwood, OH (US); Paul Robert Gemin, Cincinnati, OH (US); Arthur Vorwerk Radun, Mason, OH (US); Hao Huang, Troy, OH (US)

(73) Assignee: General Electric Company, Schenectady, NY (US)

( * ) Notice: Subject to any disclaimer, the term of this patent is extended or adjusted under 35 U.S.C. 154(b) by 321 days.

(21) Appl. No.: 15/892,962

(22) Filed: Feb. 9, 2018

(65) Prior Publication Data

US 2019/0252929 A1 Aug. 15, 2019

(51) Int. Cl.
| | | |
|---|---|---|
| *H02K 1/16* | (2006.01) | |
| *H02K 1/27* | (2006.01) | |
| *H02K 21/24* | (2006.01) | |
| *H02K 15/02* | (2006.01) | |

(52) U.S. Cl.
CPC ............... *H02K 1/165* (2013.01); *H02K 1/16* (2013.01); *H02K 1/2793* (2013.01); *H02K 15/024* (2013.01); *H02K 21/24* (2013.01); *H02K 2201/03* (2013.01)

(58) Field of Classification Search
CPC .... H02K 15/024; H02K 1/165; H02K 1/2793; H02K 21/24; H02K 2201/03; H02K 1/16
USPC ...................................... 310/156.32, 216.008
See application file for complete search history.

(56) References Cited

U.S. PATENT DOCUMENTS

| | | | | |
|---|---|---|---|---|
| 1,756,672 | A * | 4/1930 | Barr ......................... | H02K 1/16 310/216.078 |
| 6,930,428 | B2 * | 8/2005 | Grundl ..................... | H02K 1/06 310/216.008 |
| 7,667,367 | B2 * | 2/2010 | Matsuo ................... | H02K 1/148 310/216.008 |
| 7,737,597 | B2 * | 6/2010 | Jajtic ...................... | H02K 1/148 310/216.008 |
| 8,102,092 | B2 | 1/2012 | Tomohara et al. | |
| 8,198,779 | B2 * | 6/2012 | Noda ...................... | H02K 1/148 310/216.009 |
| 8,456,055 | B2 * | 6/2013 | Kinoshita ................ | H02K 1/24 310/216.008 |
| 9,419,502 | B2 | 8/2016 | Veronesi et al. | |
| 2005/0057114 | A1 * | 3/2005 | Calico ..................... | H02K 1/14 310/257 |
| 2006/0061229 | A1 * | 3/2006 | Suzuki ................... | H02K 1/148 310/216.008 |
| 2009/0026873 | A1 * | 1/2009 | Matsuo .................. | H02K 1/148 310/216.009 |

(Continued)

*Primary Examiner* — Alex W Mok
(74) *Attorney, Agent, or Firm* — Dority & Manning, P A.

(57) ABSTRACT

An electric machine includes a stator assembly including a first stator segment and a second stator segment, the first and second stator segments each including a plurality of laminations extending generally along a circumferential direction, each pair of adjacent laminations of the first and second stator segments defining a gap therebetween. The first and second stator segments are assembled together such that the laminations of the first stator segment are arranged at least partially in the gaps between the laminations of the second stator segment.

18 Claims, 8 Drawing Sheets

(56) References Cited

U.S. PATENT DOCUMENTS

| | | | |
|---|---|---|---|
| 2012/0104894 A1* | 5/2012 | Van Den Bossche | ........................ H02K 21/24 310/216.011 |
| 2012/0169175 A1 | 7/2012 | Yoon et al. | |
| 2014/0091671 A1 | 4/2014 | Irie | |
| 2015/0171674 A1* | 6/2015 | Lee | ........................ H02K 1/276 318/724 |
| 2016/0241093 A1* | 8/2016 | Patel | ........................ H02K 3/28 |
| 2017/0063183 A1* | 3/2017 | Shrestha | ........................ H02K 1/22 |
| 2017/0155309 A1 | 6/2017 | Jassal et al. | |
| 2017/0250580 A1* | 8/2017 | Rhyu | ........................ H02K 1/02 |

\* cited by examiner

ELECTRIC MACHINE

FIELD

The present subject matter relates generally to an electric machine, and more specifically, to a stator assembly for an electric machine.

BACKGROUND

Electric machines, e.g., electric motors and generators, are used in a variety of industries to convert electrical energy to mechanical energy, and vice versa, for useful purposes. For example electric machines are used in the automotive, aviation, maritime, and other industries to operate aircrafts, helicopters, automobiles, boats, submarines, trains, and/or any other suitable vehicles.

To reduce fuel consumption and improve efficiency, it is generally desirable to use electric machines with large power densities, referred to herein as the electric machine's specific power or power-to-weight ratio. Electric machines having a high specific power may be smaller and more lightweight while generating equivalent or greater power than heavier electric machines.

Manufacturing a stator of the electric machine using additive manufacturing, or 3D printing, may allow for the stator to have, e.g. complex internal structures. However, forming the stator using additive manufacturing technology may generally result in a less dense stator, and therefore an electric machine having a lower specific power.

Accordingly, a stator of an electric machine that is capable of being manufactured using additive manufacturing while still resulting in a relatively dense electric machine would be useful.

BRIEF DESCRIPTION

Aspects and advantages of the invention will be set forth in part in the following description, or may be obvious from the description, or may be learned through practice of the invention.

In one exemplary embodiment of the present disclosure, an electric machine defining an axial direction, a radial direction, and a circumferential direction is provided. The electric machine includes a stator assembly including a first stator segment and a second stator segment, the first and second stator segments each including a plurality of laminations extending generally along the circumferential direction, each pair of adjacent laminations of the first and second stator segments defining a gap therebetween. The first and second stator segments are assembled together such that the laminations of the first stator segment are arranged at least partially in the gaps between the laminations of the second stator segment.

In certain exemplary embodiments the first stator segment and the second stator segment are formed separately using an additive manufacturing process.

In certain exemplary embodiments the plurality of laminations of the first stator segment are spaced from one another along the radial direction, and wherein the plurality of laminations of second stator segment are spaced from one another along the radial direction.

In certain exemplary embodiments the plurality of laminations of the first stator segment are spaced from one another along the axial direction, and wherein the plurality of laminations of second stator segment are spaced from one another along the axial direction.

In certain exemplary embodiments the stator assembly further includes a third stator segment including a plurality of laminations extending generally along the circumferential direction, and wherein the third stator segment is assembled with the first and second stator segments such that the laminations of the third stator segment are arranged at least partially in the gaps between the laminations of the second stator segment.

For example, in certain exemplary embodiments the electric machine of claim 5, wherein the stator assembly further includes a fourth stator segment including a plurality of laminations extending generally along the circumferential direction, wherein each pair of adjacent laminations of the fourth stator segment defines a gap therebetween, and wherein the fourth stator segment is assembled with the first, second, and third stator segments such that the laminations of the third stator segment are also arranged at least partially in the gaps between the laminations of the fourth stator segment.

In certain exemplary embodiments the first stator segment further includes a backing with the plurality of laminations of the first stator segment coupled to, or formed integrally with, the backing of the first stator segment, wherein the plurality of laminations of the first stator segment define an angular span about the axial direction, wherein the backing of the first stator segment defines an angular span about the axial direction, and wherein the angular span of the plurality of laminations of the first stator segment is greater than the angular span of the backing of the first stator segment.

For example, in certain exemplary embodiments the second stator segment further includes a backing with the plurality of laminations of the second stator segment coupled to, or formed integrally with, the backing of the second stator segment, wherein the plurality of laminations of the second stator segment define an angular span about the axial direction, wherein the backing of the second stator segment defines an angular span about the axial direction, and wherein the angular span of the plurality of laminations of the second stator segment is greater than the angular span of the backing of the second stator segment.

For example, in certain exemplary embodiments the stator assembly further includes a third stator segment including a plurality of laminations extending generally along the circumferential direction and a backing, wherein the plurality of laminations of the third stator segment define an angular span about the axial direction, wherein the backing of the third stator segment defines an angular span about the axial direction, and wherein the angular span of the plurality of laminations of the third stator segment is less than or substantially equal to the angular span of the backing of the third stator segment.

In certain exemplary embodiments the first stator segment further includes a backing, wherein the second stator segment further includes a backing, wherein the first and second stator segments are assembled together such that the backing of the first stator segment is positioned adjacent to the backing of the second stator segment.

In certain exemplary embodiments the first stator segment and the second stator segment are two of a plurality of stator segments of the stator assembly, wherein each of the plurality of stator segments of the stator assembly includes a backing, and wherein the backings of the plurality of stator segments of the stator assembly form a substantially 360 degree stator yoke.

In certain exemplary embodiments the stator assembly defines a density greater than about 85 percent.

In certain exemplary embodiments the plurality of laminations of the first stator segment each define a thickness less than about 0.03 inches, wherein the plurality of laminations of the second stator segment each define a thickness less than about 0.03 inches, wherein the gaps defined between each pair of adjacent laminations of the first stator segment are each less than about 0.03 inches, and wherein the gap defined between each pair of adjacent laminations of the second stator segment are each also less than about 0.03 inches.

In certain exemplary embodiments the plurality of laminations of the first stator segment each define a thickness less than or equal to about 0.02 inches, wherein the plurality of laminations of the second stator segment each define a thickness less than or equal to about 0.02 inches, wherein the gaps defined between each pair of adjacent laminations of the first stator segment are each less than or equal to about 0.02 inches, and wherein the gaps defined between each pair of adjacent laminations of the second stator segment are each also less than or equal to about 0.02 inches.

In certain exemplary embodiments the electric machine further includes a rotor assembly rotatable about the axial direction relative to the stator assembly, wherein the rotor assembly and stator assembly together define an airgap along the axial direction.

In certain exemplary embodiments the first stator segment and the second stator segment are two of a plurality of stator segments of the stator assembly, and wherein the plurality of stator segments of the stator assembly includes between three stator segments and twenty stator segments.

In certain exemplary embodiments the plurality of laminations of the first stator segment each comprise an insulation on an outer surface, and wherein the plurality of laminations of the second stator segment each also comprise an insulation on an outer surface.

In an exemplary aspect of the present disclosure, a method for assembling a stator assembly of an electric machine is provided. The electric machine defines a circumferential direction, an axial direction, and a radial direction, the stator assembly including a first stator segment having a plurality of laminations extending generally along the circumferential direction and a second stator segment having a plurality of laminations extending generally along the circumferential direction. The method includes rotating the first stator segment of the stator assembly along the circumferential direction relative to the second stator segment of the stator assembly such that the plurality of laminations of the first stator segment extend at least partially into a plurality of gaps defined between adjacent laminations of the plurality of laminations of the second stator segment.

In certain exemplary aspects, the method further includes moving a third stator segment of the stator assembly along the radial direction such that a plurality of laminations of the third a stator segment extend at least partially into the plurality of gaps between adjacent laminations of the plurality of laminations of the second stator segment.

In certain exemplary aspects, the method further includes forming the first stator segment using an additive manufacturing process, and forming the second stator segment separately from the first stator segment using an additive manufacturing process.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "forward" and "aft" refer to the relative positions of a component based on an actual or anticipated direction of travel. For example, "forward" may refer to a front of an aircraft based on an anticipated direction of travel of the aircraft, and "aft" may refer to a back of the aircraft based on an anticipated direction of travel of the aircraft. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
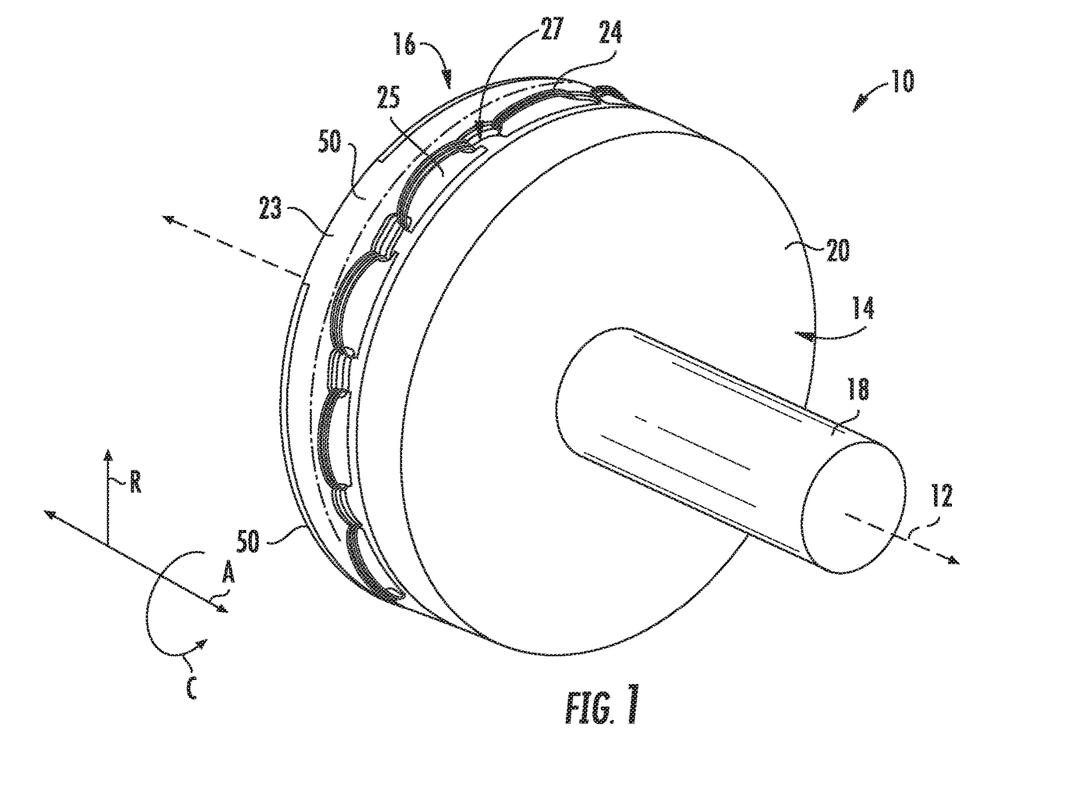
FIG. 1 is a perspective view of an electric machine in accordance with an exemplary embodiment of the present disclosure.

Referring now to the drawings, wherein identical numerals indicate the same elements throughout the Figs., FIG. 1 provides an electric machine 10 according to an exemplary embodiment of the present subject matter. It should be appreciated that in certain embodiments, the electric machine 10 may be used as a motor or generator for any suitable application or in any suitable device. For example, the electric machine 10 may be used as a power source for propulsor in an aircraft (such as for an electric fan in an aircraft), an electric motor or generator integrated into an aeronautical gas turbine engine, a primary or secondary power plant in a land-based vehicle (such as an automobile), a power source for an under-wing mounted propulsion device for an aircraft, a power source for nautical vehicles, etc.

As illustrated, the electric machine 10 defines an axis 12, an axial direction A extending along the axis 12, a radial direction R relative to the axis 12, and a circumferential direction C extending about the axis 12. Further, the electric machine 10 includes a rotor assembly 14 and a stator assembly 16, as well as a drive shaft 18. The drive shaft 18 extends generally along the axial direction A from the rotor assembly 14. The rotor assembly 14 may optionally include a plurality of bearings (not shown) on an axial end of the drive shaft 18. It will be appreciated that in certain exemplary embodiments, the electric machine 10 may be configured as electric motor for converting electrical power to torque, and providing such torque through the drive shaft 18 to a power sink (e.g., a fan or propulsor when utilized for aeronautical purposes). According to other exemplary embodiments, however, the electric machine 10 may alternatively be configured as electric generator configured to convert torque provided to the electric machine 10 through the drive shaft 18 to electrical power. Further, in certain embodiments, the electric machine 10 may operate as an electric motor and/or an electric generator depending on, e.g., an operating mode.

As is also depicted in FIG. 1, the rotor assembly 14 includes a rotor disk 20 that is mounted to, and extends from, the drive shaft 18 substantially along the radial direction R. In this regard, the rotor assembly 14, and more specifically, the rotor disk 20, is rotatable about the axis 12 and axial direction A. It will be appreciated that any suitable method of coupling drive shaft 18 to rotor disk 20 may be used to transmit torque. Further, it will be appreciated that in certain embodiments, the drive shaft 18 may include additional features configured to provide passages for a cooling fluid (not shown) within rotor assembly 14. In a non-limiting example, the cooling fluid may be airflow or a coolant.

Although not depicted, it will be appreciated that the rotor assembly 14 includes a plurality of rotor magnets. The rotor magnets are configured to generate a rotor magnetic field. Similarly, the stator assembly 16 includes a plurality of windings 24 configured to generate a stator magnetic field. The rotor magnetic field and the stator magnetic field interact to generate a torque that rotates rotor disk 20 and drive shaft 18 when, e.g., the electric machine 10 is operated as an electric motor. Notably, according to the embodiment illustrated in FIG. 1, the rotor magnets are permanent magnets and stator assembly 16 includes the windings 24. It should be appreciated, however, that in other alternative embodiments, the rotor assembly 14 and a stator assembly 16 may use any suitable combination to generate a torque on rotor disk 20 and drive shaft 18. In addition, although stator assembly 16 is illustrated in the embodiment shown as having concentrated windings, it should be appreciated that stator assembly 16 may alternatively have distributed windings or any other suitable stator winding configuration.

Moreover, it will be appreciated that for the embodiment depicted, the rotor disk 20 of the rotor assembly 14 and the stator assembly 16 are generally spaced from one another along the axial direction A of the electric machine 10, and generally define an airgap 22 therebetween along the axial direction A. Further, in such a manner, the rotor magnets may define a magnetization direction (i.e., a north-south pole orientation) that extends along the axial direction A, such that the electric machine 10 may be referred to as an "axial flux" machine. It should be appreciated, however, that according to alternative embodiments, the electric machine 10 may instead be configured as a "radial flux" electric machine 10, as will be discussed in more detail below.

Figure 2:
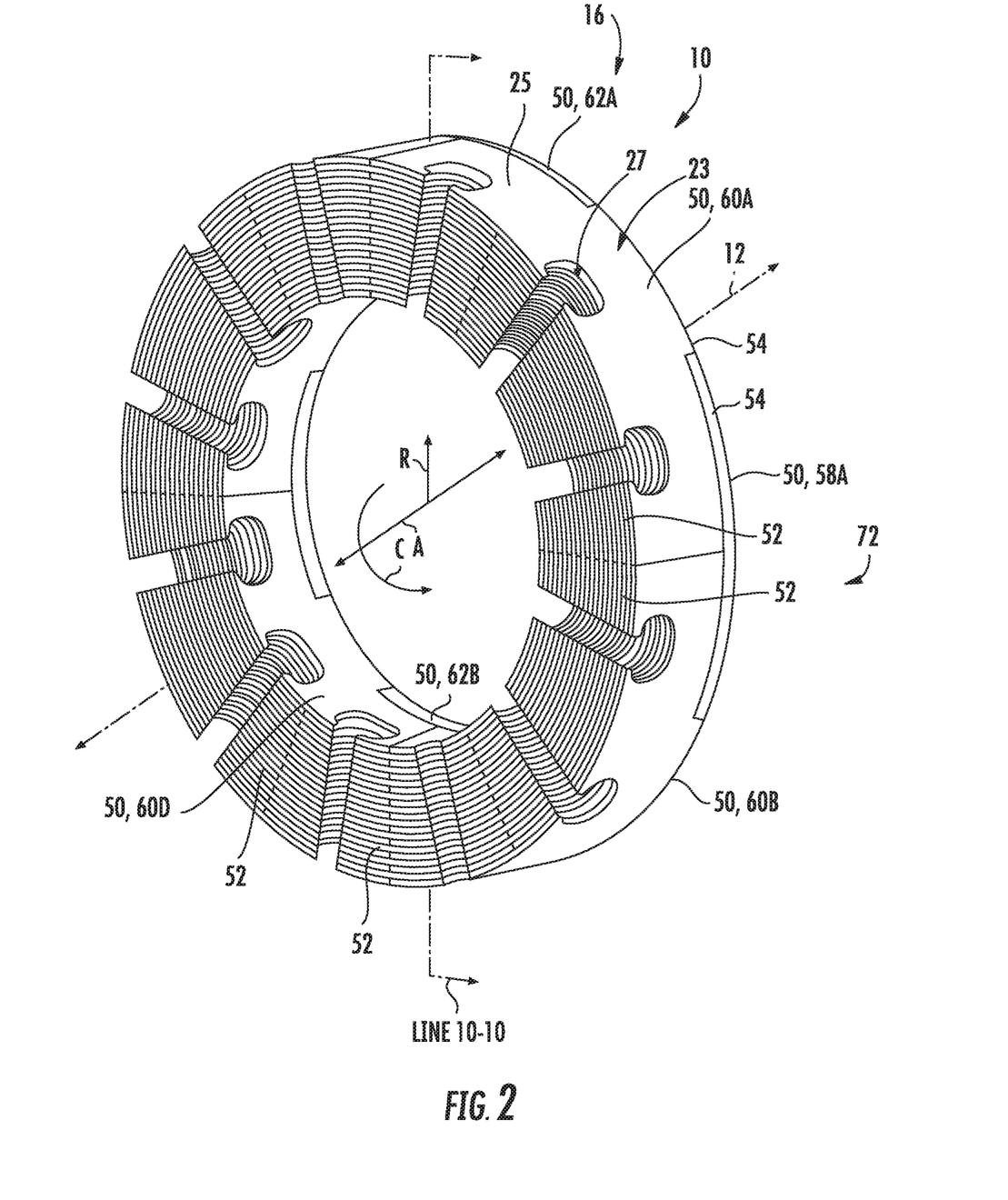
FIG. 2 is a perspective view of a stator assembly of the exemplary electric machine of FIG. 1.

Referring now to FIG. 2, a perspective, isolated view is provided of a portion of the exemplary stator assembly 16 described above with reference to FIG. 1 (i.e., the stator assembly 16 without the windings 24). The portion of the stator assembly 16 depicted is formed of a plurality of individual stator segments 50, with each individual stator segment 50 having a plurality of laminations 52 extending generally along the circumferential direction C and a backing 54. (Note that the "stator segments" are referred to generally with the numeral "50," however, specific stator segments are referred to using other numerals below.) For the embodiment depicted, it will be appreciated that the stator assembly 16 generally includes a stator yoke 23 and a plurality of stator teeth 25, each of the stator teeth 25 defining at least in part a stator slot 27 with an adjacent stator tooth 25. The stator slot 27 may be configured for receiving at least in part a winding 24. The plurality of stator segments 50, for the embodiment depicted, substantially completely form the stator yoke 23 and the plurality of stator teeth 25.

Moreover, as the exemplary stator assembly 16 of FIG. 2 is configured for incorporation into an axial flux electric machine (see FIG. 1), the plurality of laminations 52 of each of the plurality of individual stator segments 50 extend along the circumferential direction C and are spaced from one another along the radial direction R. Although the individual stator segments 50 will be described in more detail below, it will be appreciated that for each stator segment 50 depicted, the individual laminations 52 are coupled to, or formed integrally with, the backing 54. Further, adjacent laminations 52 of an individual stator segment 50 define gaps 56 therebetween (i.e., along the radial direction R for the embodiment shown; see, e.g., FIGS. 4 and 6, described below). The laminations 52 of one stator segment 50 are configured to slide at least partially into corresponding gaps 56 defined by adjacent laminations 52 of an adjacent stator segment 50. The laminations 52 of the two stator segments 50 together form a substantially solid portion of the stator assembly 16. Additionally, as the individual laminations 52 are formed separately, the individual laminations 52 may be formed relatively thin, such that the resulting stator assembly 16 includes relatively thin laminations 52 that are relatively closely packed together. Such may generally result in a more dense electric machine 10, as will be appreciated from the discussion below.

For the exemplary stator assembly 16 depicted, the stator assembly 16 generally includes, and is formed of, eight individual stator segments 50 assembled together. Six of the stator segments 50 are configured as "base" stator segments configured to slide together generally along the circumferential direction C. More specifically, two of the base stator segments are configured as major base stator segments, or simply, major stator segments 58 (having a relatively large span), and four of the base stator segments are configured as minor base stator segments, or simply, minor stator segments 60 (having a relatively small span). Further, the remaining two stator segments 50 are configured as "keyed" stator segments 62 configured to slide in position generally along the axial direction A for the embodiment depicted. It will be appreciated, however, that in other exemplary embodiments, the stator assembly 16 may include any other suitable number of stator segments 50. For example, in other embodiments, the plurality of stator segments 50 of the stator assembly 16 may include between three stator segments 50 and twenty stator segments 50. Further, any suitable number of the stator segments 50 may be base stator segments 58, 60 or keyed stator segments 62, and further, each of the base stator segments 58, 60 may have the same size (such as there is no distinction between primary and minor stator segments 58, 60), or each of the base stator segments 58, 60 may have any other suitable size.

Figure 3:
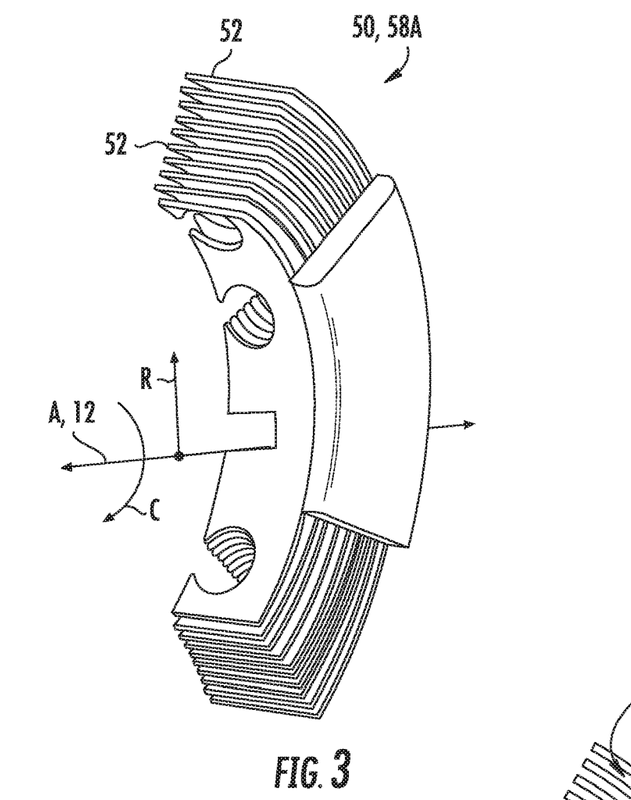
FIG. 3 is a perspective view of a stator segment of the exemplary stator assembly of FIG. 2, in accordance with an exemplary embodiment of the present disclosure.
Figure 4:
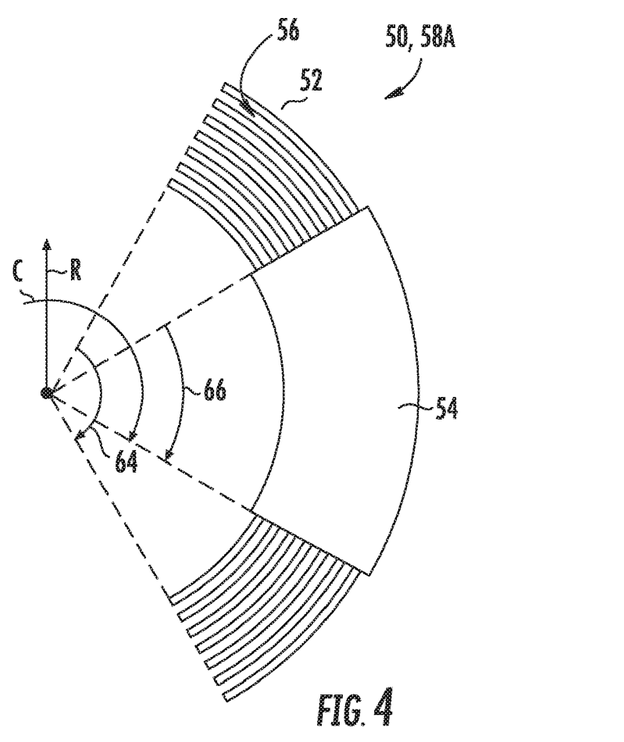
FIG. 4 is a plan view of the exemplary stator segment of FIG. 3.

Referring now particularly to FIGS. 3 and 4, a first major stator segment 58A of the plurality of stator segments 50 of the stator assembly 16 is depicted. FIG. 3 provides a perspective view of the first major stator segment 58A and FIG. 4 provides a plan view of the first major stator segment 58A. As stated, the first major stator segment 58A includes a plurality of laminations 52 extending generally along the circumferential direction C and a backing 54. The laminations 52 may be formed integrally with, or otherwise attached to, the backing 54. Moreover, the plurality of laminations 52 of the first major stator segment 58A are spaced from one another along the radial direction R, such that each pair of adjacent laminations 52 of the plurality of laminations 52 of the first major stator segment 58A defines a gap 56 therebetween generally along the radial direction R (see FIG. 4).

As will also be appreciated, the plurality of laminations 52 of the first major stator segment 58A define an angular span 64 about the axis 12 and axial direction A, and similarly, the backing 54 of the first major stator segment 58A defines an angular span 66 about the axis 12 and axial direction A. For the embodiment depicted, the angular span 64 of the plurality of laminations 52 of the first major stator segment 58A is greater than the angular span 66 of the backing 54 of the first major stator segment 58A. For example, for the embodiment depicted, the angular span 64 of the plurality of laminations 52 of the first major stator segment 58A is greater than about sixty degrees and less than about one hundred and eighty degrees, such as approximately one hundred and twenty degrees. Also, for the embodiment depicted, the angular span 66 of the backing 54 of the first major stator segment 58A is greater than about thirty degrees and less than about ninety degrees, such as approximately sixty degrees.

Figure 5:
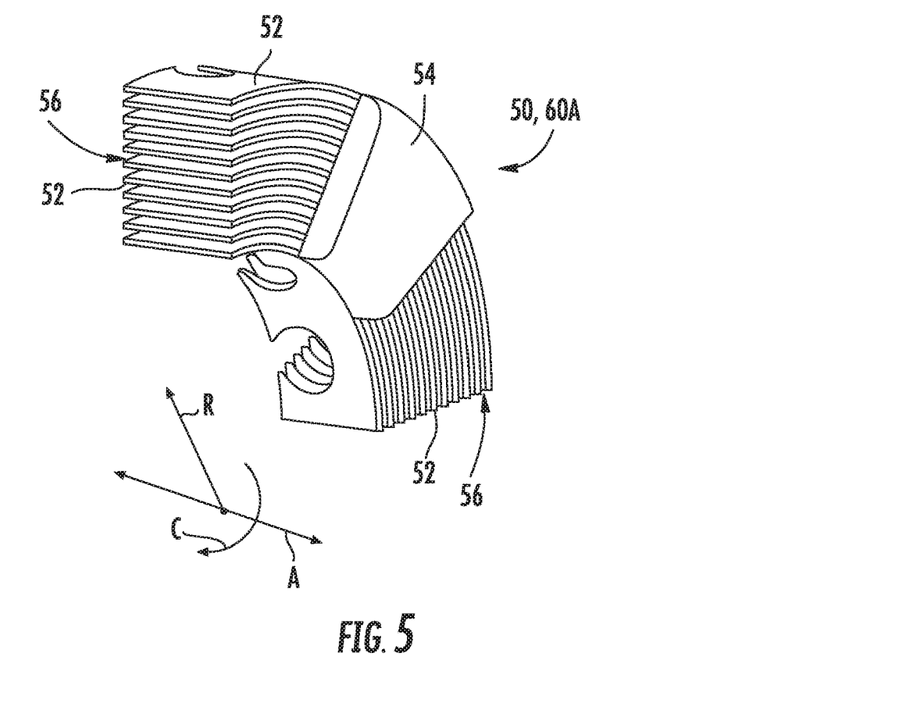
FIG. 5 is a perspective view of a stator segment of the exemplary stator assembly of FIG. 2, in accordance with another exemplary embodiment of the present disclosure.
Figure 6:
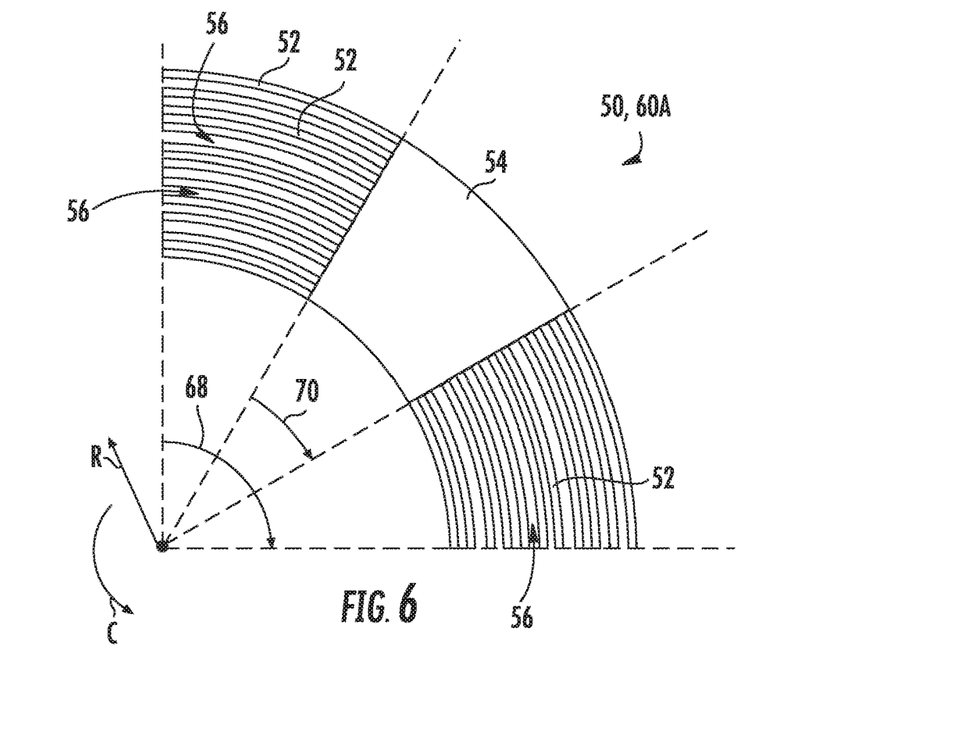
FIG. 6 is a plan view of the exemplary stator segment of FIG. 5.

Referring now particularly to FIGS. 5 and 6, a first minor stator segment 60A of the plurality of stator segments 50 of the stator assembly 16 is depicted. FIG. 5 provides a perspective view of the first minor stator segment 60A and FIG. 6 provides a plan view of the first minor stator segment 60A. As stated, the first minor stator segment 60A also includes a plurality of laminations 52 extending generally along the circumferential direction C and a backing 54. The laminations 52 may be formed integrally with, or otherwise attached to, the backing 54. Moreover, the plurality of laminations 52 of the first minor stator segment 60A are spaced from one another along the radial direction R, such that each pair of adjacent laminations 52 of the plurality of laminations 52 of the first minor stator segment 60A defines a gap 56 therebetween generally along the radial direction R (see FIG. 6).

As will also be appreciated, the plurality of laminations 52 of the first minor stator segment 60A define an angular span 68 about the axis 12 and axial direction A, and similarly, the backing 54 of the first minor stator segment 60A defines an angular span 70 about the axis 12 and axial direction A. For the embodiment depicted, the angular span 68 of the plurality of laminations 52 of the first minor stator segment 60A is greater than the angular span 70 of the backing 54 of the first minor stator segment 60A. For example, for the embodiment depicted, the angular span 68 of the plurality of laminations 52 of the first minor stator segment 60A is greater than about thirty degrees and less than about one hundred and twenty degrees, such as approximately ninety degrees. Also, for the embodiment depicted, the angular span 70 of the backing 54 of the first minor stator segment 60A is greater than about fifteen degrees and less than about sixty degrees, such as approximately thirty degrees.

In such a manner, it will further be appreciated that for the embodiment depicted the angular span 68 of the plurality of laminations 52 of the first minor stator segment 60A is less than the angular span 64 of the plurality of laminations 52 of the first major stator segment 58A. Similarly, it will be appreciated that for the embodiment depicted, the angular span 70 of the backing 54 of the first minor stator segment 60A is less than the angular span 70 of the backing 54 of the first major stator segment 58A.

Figures 7, 8, 9:
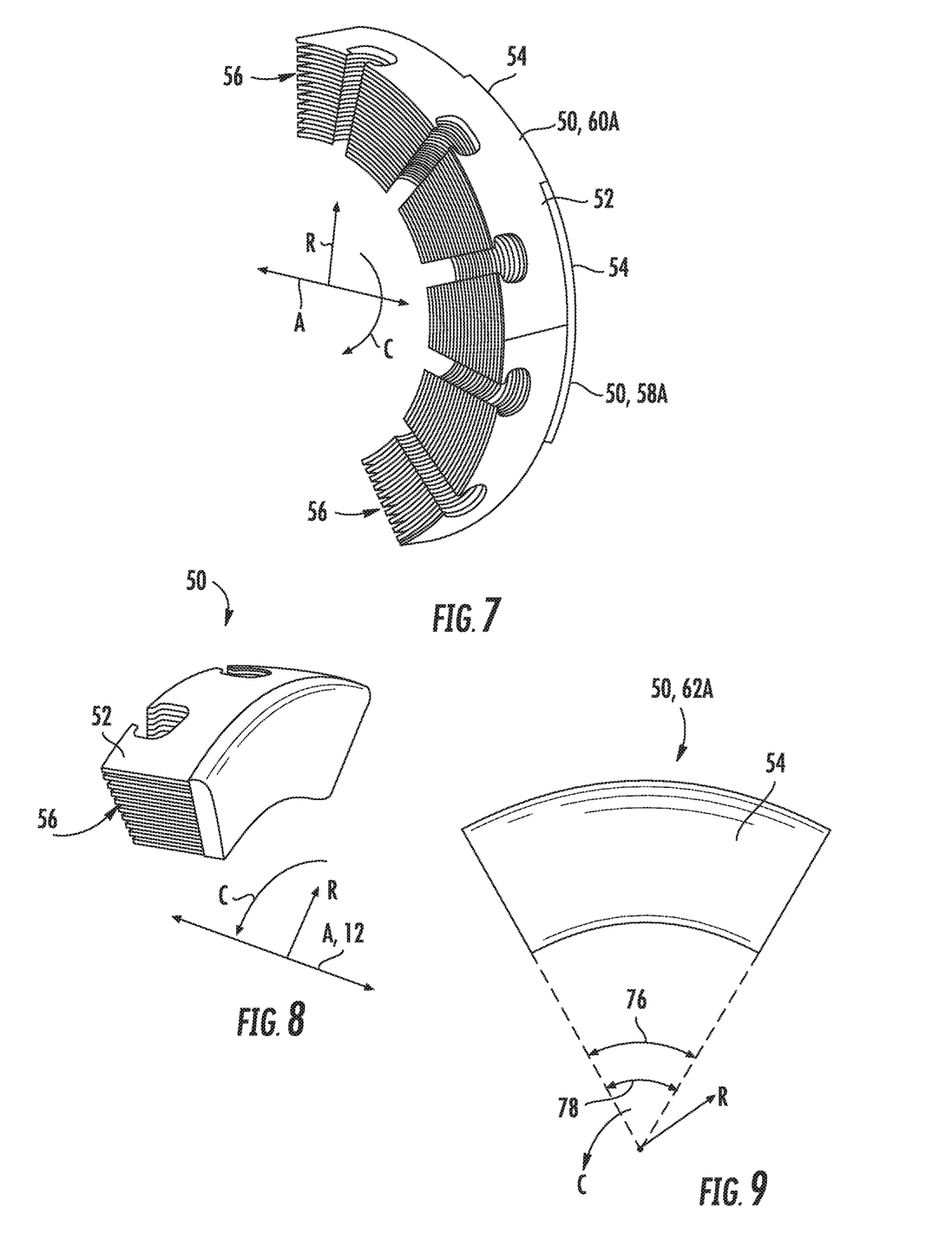
FIG. 7 is a perspective view of a portion of the exemplary stator assembly of FIG. 2.
FIG. 8 is a perspective view of a stator segment of the exemplary stator assembly of FIG. 2, in accordance with yet another exemplary embodiment of the present disclosure.
FIG. 9 is a plan view of the exemplary stator segment of FIG. 8.

Referring now to FIG. 7, a perspective view is provided of a first major stator segment 58A and the first minor stator segment 60A in an assembled position. As is shown, and as will be appreciated, when the first major stator segment 58A and the first minor stator segment 60A are assembled together, they are assembled such that each of their respective pluralities of laminations 52 are interdigitated with one another (alternatingly arranged with one another). More specifically, when the first primary and first minor stator segments 58A, 60A are assembled together, they are assembled such that the plurality of laminations 52 of the first major stator segment 58A are arranged at least partially in the gaps 56 between the adjacent laminations 52 of the plurality of laminations 52 of the first minor stator segment 60A, and further such that the plurality of laminations 52 of the first minor stator segment 60A are arranged at least partially in the gaps 56 between the adjacent laminations 52 of the plurality of laminations 52 of the first major stator segment 58A. Notably, when these stator segments 58A, 60A are assembled together, the backing 54 of the first major stator segment 58A is positioned adjacent to the backing 54 of the first minor stator segment 60A along the circumferential direction C. Further, the interdigitated portion of the laminations 52 of the first primary and first minor stator segments 58A, 60A together form a substantially solid stator assembly portion (i.e., form a substantially solid portion of the stator yoke 23, as well as a substantially solid plurality of stator teeth 25).

Referring back to FIG. 2, it will be appreciated that for the particular embodiment depicted, the stator assembly 16 further includes a second minor stator segment 60B positioned on an opposite side of the first major stator segment 58A than the first minor stator segment 60A (circumferentially). The second minor stator segment 60B similarly includes a plurality of laminations 52 that, when assembled, are arranged at least partially in the gaps 56 between adjacent laminations 52 of the first major stator segment 58A. The second minor stator segment 60B may define an annular span (not labeled) for its plurality of laminations 52 substantially equal to the angular span 68 of the plurality laminations 52 of the first minor stator segment 60A (see FIG. 5), and similarly, a backing 54 of the second minor stator segment 60B may define an annular span (not labeled)

that is substantially equal to the angular span 70 of the backing 54 of the first minor stator segment 60A (see FIG. 5), described above.

As will also be appreciated from FIG. 2, the exemplary stator assembly 16 depicted further includes a second major stator segment 58B, a third minor stator segment 60C, and a fourth minor stator segment 60D. The second major stator segment 58B is configured in substantially the same manner as the first major stator segment 58A, and the third and fourth minor stator segments 60C, 60D are configured in substantially the same manner as the first and second minor stator segments 60A, 60B. Further, the second major stator segment 58B, third minor stator segment 60C, and fourth minor stator segment 60D are assembled together in substantially the same manner that the first major stator segment 58A, first minor stator segment 60A, and second minor stator segment 60B are assembled, as described above.

In such a manner, the first primary, first secondary, and second minor stator segments 58A, 60A, 60B may together form a first group 72 of stator segments 50, and the second primary, third secondary, and fourth minor stator segments 58B, 60C, 60D may together form a second group 74 of stator segments 50. In order to assemble the first group 72 and the second group 74 of stator segments 50 together, the stator assembly 16 further includes the keyed stator segments 62, noted briefly above.

Referring now also to FIGS. 8 and 9, a first keyed stator segment 62A of the plurality of stator segments 50 of the stator assembly 16 is depicted. FIG. 8 provides a perspective view of the first keyed stator segment 62A and FIG. 9 provides a plan view of the first keyed stator segment 62A. As with the other stator segments 50, the first keyed stator segment 62A includes a plurality of laminations 52 extending generally along the circumferential direction C and a backing 54. The laminations 52 may be formed integrally with, or otherwise attached to, the backing 54. Moreover, the plurality of laminations 52 of the first keyed stator segment 62A are spaced from one another along the radial direction R, such that each pair of adjacent laminations 52 of the plurality of laminations 52 of the first keyed stator segment 62A defines a gap 56 therebetween generally along the radial direction R (see FIG. 8).

As will also be appreciated, the plurality of laminations 52 of the first keyed stator segment 62A define an angular span 76 about the axial direction A, and similarly, the backing 54 of the first keyed stator segment 62A defines an angular span 78 about the axial direction A. For the embodiment depicted, the angular span 76 of the plurality of laminations 52 of the first keyed stator segment 62A is less than, or substantially equal to, the angular span 78 of the backing 54 of the first keyed stator segment 62A. More specifically, for the embodiment depicted, the angular span 76 of the plurality of laminations 52 of the first keyed stator segment 62A is substantially equal to the angular span 78 of the backing 54 of the first keyed stator segment 62A. For example, for the embodiment depicted, the angular span 76 of the plurality of laminations 52 of the first keyed stator segment 62A is greater than about thirty degrees and less than about ninety degrees, such as approximately sixty degrees. Also, for the embodiment depicted, the angular span 78 of the backing 54 of the first keyed stator segment 62A is greater than about thirty degrees and less than about ninety degrees, such as approximately sixty degrees.

Figure 10:
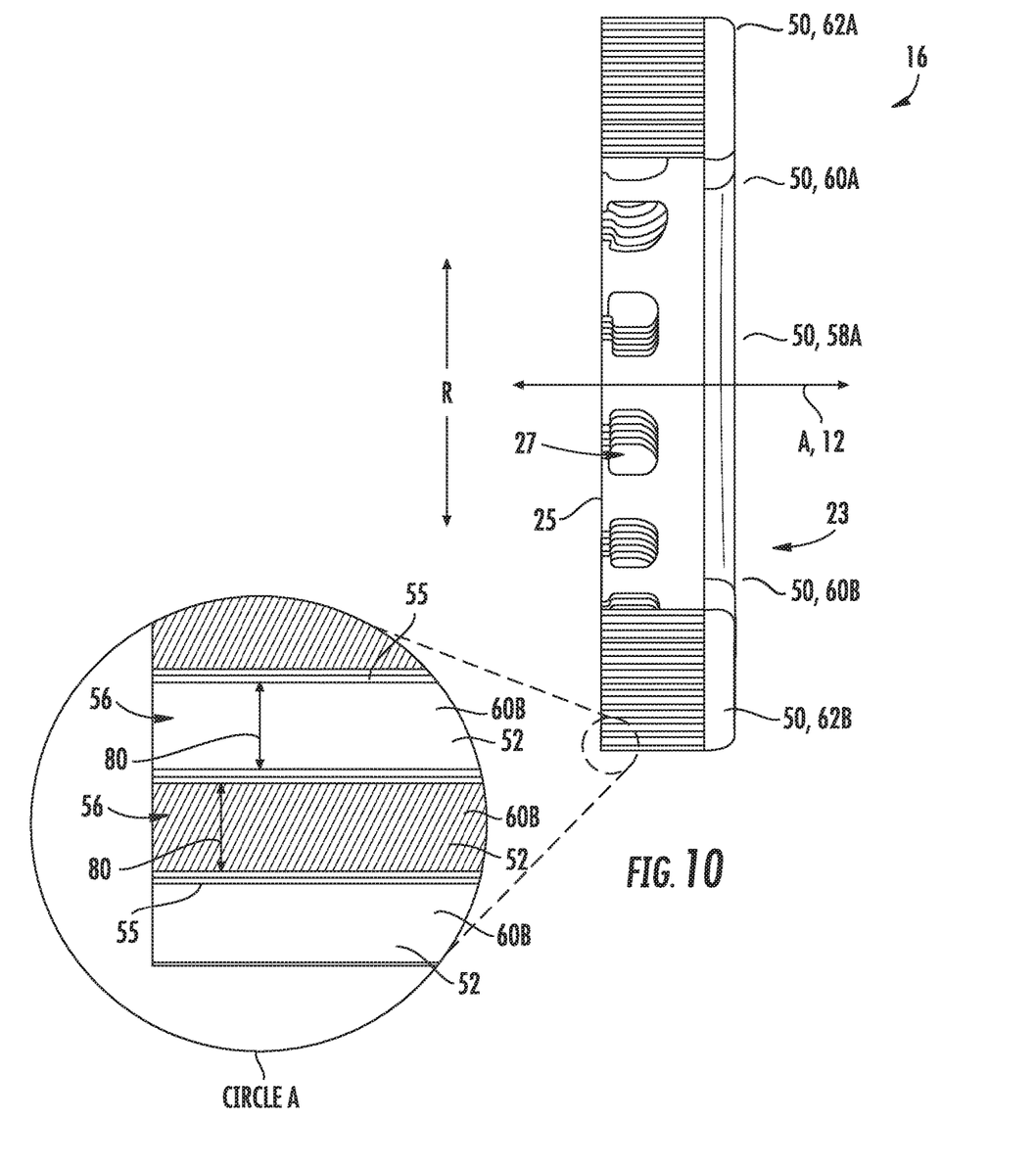
FIG. 10 is a cross-sectional view of the exemplary stator assembly of FIG. 2.

Referring back to FIG. 2, and now also to FIG. 10, providing a cross-sectional view of the stator assembly 16 along Line 10-10 in FIG. 2, it will be appreciated that when the first keyed stator segment 62A is assembled with the first major stator segment 58A and first minor stator segment 60A, it is installed such that the laminations 52 of the first keyed stator segment 62A are arranged at least partially in the gaps 56 defined between adjacent laminations 52 of the plurality of laminations 52 of the first minor stator segment 60A. More particularly, as is depicted in FIG. 2, when the first keyed stator segment 62A is assembled with other stator segments 50, the plurality of laminations 52 of the first keyed stator segment 62A are additionally positioned in a plurality of gaps (not labeled) defined between adjacent laminations 52 of the third minor stator segment 60C. In such a manner, the first keyed stator segment 62 may act to join/assemble the first group 72 of stator segments and the second group 74 of stator segments.

Further, for the particular exemplary embodiment depicted, the stator assembly 16 further includes a second keyed stator segment 62B configured in substantially the same manner as the first keyed stator segment 62A. As shown, the second keyed stator segment 62B also acts to couple/assemble the first and second groups 72, 74 of stator segments 50. More particularly, the second keyed stator segment 62B, when assembled with the remaining stator segments 50, is assembled such that a plurality of laminations 52 of the second keyed stator segment 62B are positioned at least partially in the plurality of gaps 56 defined between adjacent laminations 52 of the second secondary main stator segment 50, as well as at least partially in a plurality of gaps 56 (not labeled) defined between adjacent laminations 52 of the fourth minor stator segment 60D. In such a manner, the second keyed stator segment 62B may also act to join the first and second groups 72, 74 of stator segments 50.

As will also be appreciated from the exemplary embodiment depicted in, e.g., FIGS. 2 and 10, each of the plurality of stator segments 50 of the stator assembly 16, when assembled, are assembled such that each of their respective backings 54 are positioned adjacent to one another. In such a manner, the backings 54 of the plurality of stator segments 50 of the stator assembly 16 form a substantially 360 degree stator yoke 23 for the stator assembly 16. Notably, however, in other exemplary embodiments, the backings 54 may be machined off or otherwise removed after the plurality stator segments 50 are assembled such that each of their respective laminations 52 are interdigitated in the manner described above to form a substantially solid portion of the stator assembly 16.

It will be appreciated that each of the individual stator segments 50 may be formed separately from one another using any suitable manufacturing process. For example, in at least certain exemplary embodiments, each of the individual stator segments 50 may be formed separately using an additive manufacturing process. Certain additive manufacturing processes apply a source of energy, such as a laser beam or electron beam, to a portion or portions of a layer of powder or granular material causing the powder or granules to fuse or bind to each other. After fusing a portion of powder or granules together, another layer of powder or granules may be deposited over the first layer, and a portion thereof may also be fused to itself as well as to a portion or portions of the layer underneath which was previously fused. This process may be repeated successively, on layer after layer of powder or granular material. The laser or electron beam or other energy source may be directed towards, and may fuse, sinter, or melt such portion or portions of successive layers as to create a three-dimensional object. A computer model or program may be used to orient the application of laser or electron beam, or other energy source, to each successive layer, as well as the energy source's intensity, size, and duration.

For example, a laser source, electron beam, or source of other energy may be directed to a scanner and the scanner may implement instructions from a computer to direct the placement, energy intensity, size, and duration of energy application to a portion or portions of layer of powder or granular material in accordance with a computer model or program representing the ultimate three-dimensional shaped part desired. Examples of additive manufacturing processes that may be used in accordance with the present disclosure include selective laser melting, selective laser sintering, direct metal laser sintering, electron beam melting, or other methods that include directing an energy beam towards powder or granular material to fuse, agglomerate, melt, sinter, or otherwise attached a portion of particles or granules to each other, as well as to a portion or portions of underlying material which has already been fused, agglomerated, melted, sintered, or otherwise attached together.

In such a manner, referring particularly to the close-up, callout Circle A in FIG. 10, it will be appreciated that in at least certain exemplary embodiments, the plurality of laminations 52 of each of the plurality of stator segments 50 may define a thickness 80 less than about 0.03 inches, such as less than or equal to about 0.02 inches. Further, in at least certain exemplary embodiments, the gaps 56 defined between each pair of adjacent laminations 52 of each of the stator segments 50 may also be less than about 0.03 inches, such as less than or equal to about 0.02 inches. The thicknesses 80 of each of the pluralities of laminations 52 of each of the plurality of stator segments 50 may be substantially equal to another. Further, the gaps 56 defined between each adjacent pair of laminations 52 of each of the pluralities of laminations 52 of the plurality of stator segments 50 may also be substantially equal to one another.

Accordingly, for example, the plurality of laminations 52 of the first major stator segment 58A each define a thickness 80 along the radial direction R less than about 0.03 inches, such as less than or equal to about 0.02 inches, such as substantially equal to 0.02 inches, as well as a gap 56 along the radial direction R between adjacent laminations 52 less than about 0.03 inches, such as less than or equal to about 0.02 inches, such as substantially equal to about 0.02 inches (see FIG. 4). Similarly, the plurality of laminations 52 of the first minor stator segment 60A each define a thickness 80 along the radial direction R less than about 0.03 inches, such as less than or equal to about 0.02 inches, such as substantially equal to 0.02 inches, as well as a gap 56 along the radial direction R between adjacent laminations 52 less than about 0.03 inches, such as less than or equal to about 0.02 inches, such as substantially equal to about 0.02 inches (see FIG. 6).

Notably, in certain exemplary embodiments, the gaps 56 between adjacent laminations 52 of the various stator segments 50 may be slightly larger than an actual thickness 80 of the laminations 52. More specifically, in certain embodiments, the laminations 52 may include an insulation layer 55 applied thereto (see Callout Circle A in FIG. 10). For example, in certain embodiments, each of the laminations 52 of the plurality of stator segments 50 of the stator assembly 16 may include an insulation layer 55 provided through, e.g., an oxide bath, such as an oxide insulation, provided manually, such as a resin insulation, or any other suitable insulation. According to the current disclosure, a thickness of the insulation layers 55 on each lamination 52 may be very thin, on the order of 10 μm, or 20 μm, or less.

Notably, by forming individual stator segments 50 using, e.g., additive manufacturing processes, having the plurality of laminations 52 and gaps 56 therebetween, and assembling such individual stator segments 50 in the manner described above, an overall more dense stator assembly 16/electromagnetic core of the stator assembly 16 may be formed. More specifically, forming the stator assembly 16/electromagnetic core of the stator assembly 16 in such a manner, as well as applying relatively thin layers 55 of insulation to the plurality of laminations 52 of the various stator segments 50 prior to assembly, an increase in a volume fraction of ferromagnetic material of such core without a concomitant decrease in the density of laminations 52, or number of laminations 52 per volume of the core part, may result. This increased relative fraction of ferromagnetic material, referred to as a stacking factor, may beneficially improve performance, efficiency, or other operating parameters of an electromagnetic machine. For example, in certain exemplary embodiments, the stator assembly 16 may define a density greater than about 85 percent, such as greater than or equal to about 90 percent. Such may result in a relatively efficient electric machine 10.

Notably, another benefit of forming the various stator segments 50 using an additive manufacturing process is that relatively complex internal structures may be formed in the various stator segments 50. For example, embedded channels for temperature regulation, spaces for windings 24, or other conformational characteristics may be built in to the part so manufactured as the part is being produced, simplifying the ultimate assembly of an the electric machine 10 containing such part. Using an additive manufacturing process in accordance with the present invention also allows for production of parts with complex topologies which are undesirably complex or cost prohibitive to manufacture according to conventional methods.

Figure 11:
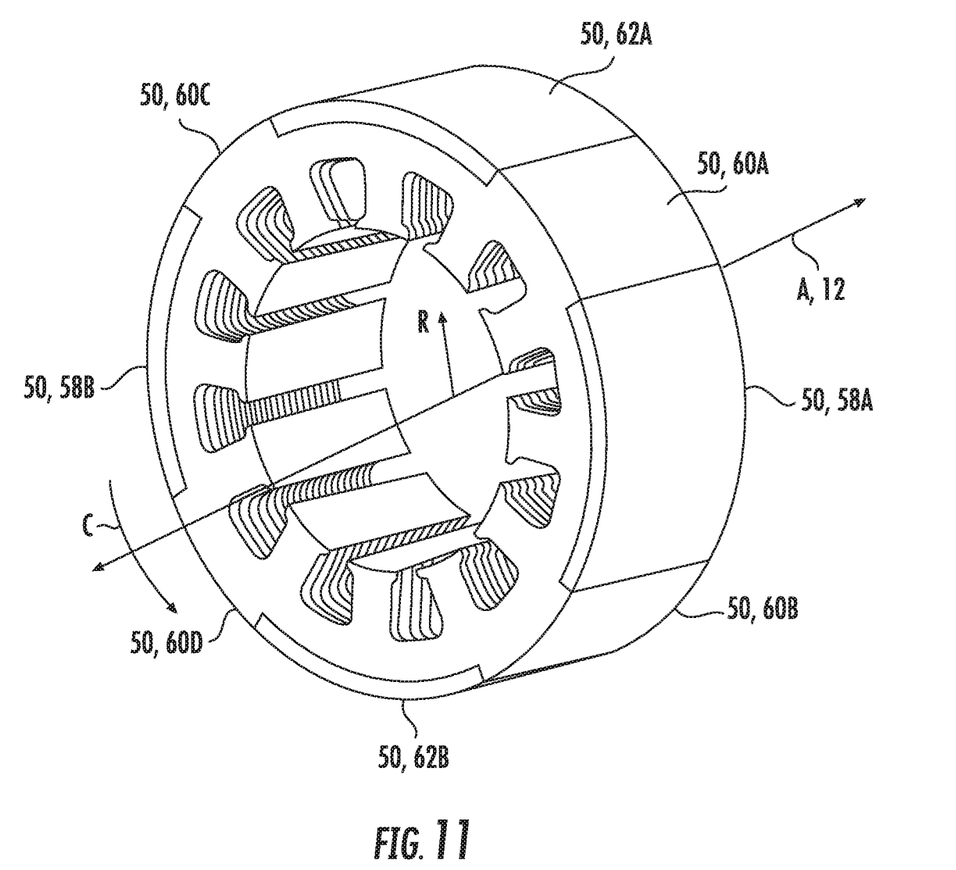
FIG. 11 is a perspective view of a stator assembly of an electric machine in accordance with another exemplary embodiment of the present disclosure.

Referring now briefly to FIG. 11, a perspective view of a stator assembly 16 of an electric machine 10 in accordance with another exemplary embodiment of the present disclosure is provided. The exemplary stator assembly 16 of FIG. 11 may be configured in substantially the same manner as the exemplary stator assembly 16 described above with reference to FIGS. 1 through 10. For example, the exemplary stator assembly 16 may be formed of a plurality of stator segments 50 assembled together in such a manner that a plurality of laminations 52 of each stator segment 50 are interdigitated with laminations 52 of an adjacent stator segment 50. As with the embodiment above, the plurality of stator segments 50 of the stator assembly 16 of the embodiment of FIG. 11 includes a plurality of main stator segments (or rather, major stator segments 58 and minor stator segments 60) and keyed stator segments 62.

Notably, however, the plurality of laminations 52 of each of the plurality of stator segments 50, although extending generally in the circumferential direction C, are instead spaced apart from one another along the axial direction A. In such a manner, the main stator segments may similarly be assembled by rotating, e.g., a first major stator segment 58A along the circumferential direction C relative to an adjacent, first minor stator segment 60A to insert at least a portion of the plurality of laminations 52 of the first major stator segment 58A into a corresponding plurality of gaps 56 defined between adjacent laminations 52 of a plurality laminations 52 of the first minor stator segment 60A. However, the keyed stator segments 62 may instead be assembled by moving the keyed stator segments 62 along the radial direction R into the gaps 56 defined between adjacent laminations 52 of the respective main stator segments 50.

In such a manner, it will be appreciated that the electric machine 10 including the exemplary stator assembly 16 of FIG. 11 may be configured as a "radial flux" electric machine 10. With such an embodiment, rotor magnets of a rotor assembly 14 (not shown) of an electric machine 10 including such a stator assembly 16 may be configured to generate a magnetic field that extends substantially along the radial direction R between the rotor assembly 14 and the stator assembly 16 (and the rotor assembly 14 and stator assembly 16 may be configured to define an airgap along the radial direction R). Further, although the exemplary stator assembly 16 of FIG. 11 is depicted as being configured for an in-runner electric machine 10, in still other exemplary embodiments, the stator assembly 16 may be configured for use in an out-runner electric machine 10.

Figure 12:
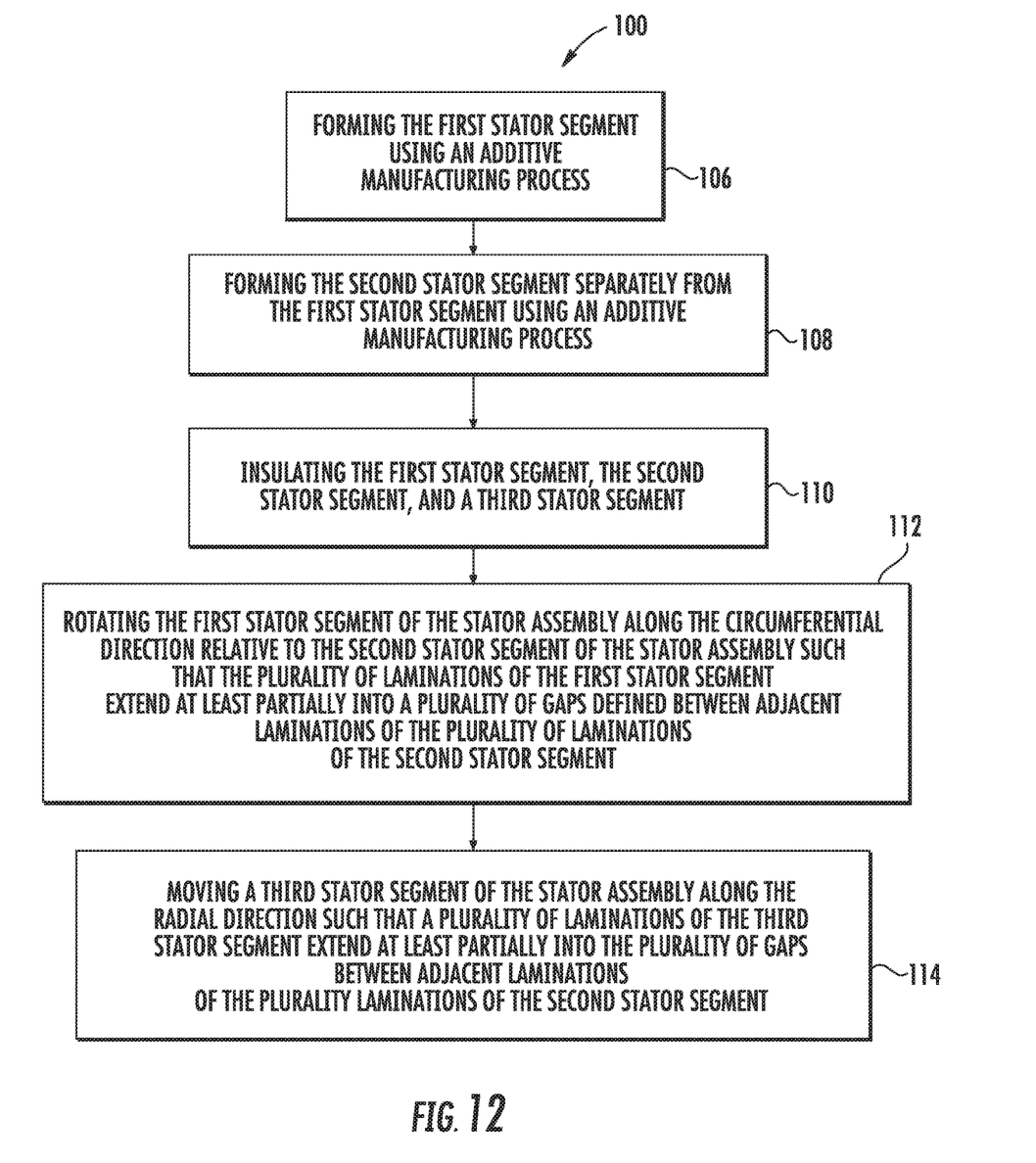
FIG. 12 is a flow diagram of a method for assembling a stator assembly of an electric machine in accordance with an exemplary aspect of the present disclosure.

Additionally, referring now to FIG. 12, a method 100 for assembling a stator assembly of an electric machine in accordance with an exemplary aspect of the present disclosure is provided. The exemplary electric machine may be configured in accordance with one or more the exemplary electric machines described above with reference to FIGS. 1 through 11. Accordingly, in certain exemplary aspects, the electric machine may define a circumferential direction, an axial direction, and a radial direction. The stator assembly may include a first stator segment having a plurality of laminations extending generally along the circumferential direction and a second stator segment having a plurality of laminations extending generally along the circumferential direction.

As is depicted, the method 100 generally includes at (102) rotating the first stator segment of the stator assembly along the circumferential direction relative to the second stator segment of the stator assembly such that the plurality of laminations of the first stator segment extend at least partially into a plurality of gaps defined between adjacent laminations of the plurality of laminations of the second stator segment.

Further, the exemplary method 100 includes moving a third stator segment of the stator assembly along the radial direction or along the axial direction such that a plurality of laminations of the third stator segment extend at least partially into the plurality of gaps between adjacent laminations of the plurality laminations of the second stator segment. More specifically, for the exemplary aspect depicted, the exemplary method 100 includes at (104) moving a third stator segment of the stator assembly along the radial direction such that a plurality of laminations of the third stator segment extend at least partially into the plurality of gaps between adjacent laminations of the plurality laminations of the second stator segment. In such a manner, it will be appreciated that the electric machine may be configured as an axial flux electric machine.

Moreover, the exemplary method 100 additionally includes, for the exemplary aspect depicted, at (106) forming the first stator segment using an additive manufacturing process, and (108) forming the second stator segment separately from the first stator segment using an additive manufacturing process. Any suitable additive manufacturing process may be utilized. Further, the exemplary method 100 includes, for the exemplary aspect depicted, at (110) insulating the first stator segment, the second stator segment, and the third stator segment. In certain exemplary aspects, insulating the first stator segment, the second stator segment, and the third stator segment at (110) may include insulating the plurality of laminations of the first stator segment, the plurality of laminations of the second stator segment, and the plurality of laminations of the third stator segment. Additionally, in certain exemplary aspects, insulating the first stator segment, the second stator segment, and the third stator segment at (110) may include insulating the first, second, and third stator segments prior to assembly of the first and second stator segments (i.e., prior to rotating the first stator segment of the stator assembly along the circumferential direction relative to the second stator segment of the stator assembly at (102) and moving the third stator segment of the stator assembly along the radial direction at (104)). Any suitable process may be provided for insulating the first and second stator segments at (110).

Accordingly, it will be appreciated that when the exemplary method 100 is applied to the exemplary electric machine described above with reference to FIGS. 1 through 10, the first stator segment may be a first major stator segment 58A, the second stator segment may be a first minor stator segment 60A, and the third stator segment may be a first keyed stator segment 62A.

Although not depicted, it will accordingly be appreciated that the method 100 may further include moving one or more additional main stator segments along the circumferential direction to interdigitated laminations of such main stator segment with laminations of an adjacent stator segment, and/or moving one or more additional keyed stator segments along the radial direction, or axial direction, to interdigitate one or more of such keyed stator segments with the laminations of the main stator segments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electric machine defining an axial direction, a radial direction, and a circumferential direction, the electric machine comprising:
   a stator assembly comprising a first stator segment and a second stator segment,
   wherein the first and second stator segments each comprises a plurality of laminations extending generally along the circumferential direction,
   wherein each pair of adjacent laminations of the first and second stator segments defines a gap therebetween,
   wherein the first and second stator segments are assembled together such that the laminations of the first stator segment are arranged at least partially in the gaps between the laminations of the second stator segment,
   wherein the stator assembly further comprises a third stator segment comprising a plurality of laminations extending generally along the circumferential direction and a backing,
   wherein the plurality of laminations of the third stator segment define an angular span about the axial direction, wherein the backing of the third stator segment defines an angular span about the axial direction,
   wherein the angular span of the plurality of laminations of the third stator segment is less than or substantially equal to the angular span of the backing of the third stator segment, wherein the first stator segment further comprises a backing with the plurality of laminations of the first stator segment coupled to, or formed integrally with, the backing of the first stator segment,
wherein the plurality of laminations of the first stator segment define an angular span about the axial direction,
wherein the backing of the first stator segment defines an angular span about the axial direction, and
wherein the angular span of the plurality of laminations of the first stator segment is greater than the angular span of the backing of the first stator segment.

2. The electric machine of claim 1, wherein the first stator segment and the second stator segment are formed separately using an additive manufacturing process.

3. The electric machine of claim 1,
wherein the plurality of laminations of the first stator segment are spaced from one another along the radial direction, and
wherein the plurality of laminations of second stator segment are spaced from one another along the radial direction.

4. The electric machine of claim 1,
wherein the plurality of laminations of the first stator segment are spaced from one another along the axial direction, and
wherein the plurality of laminations of second stator segment are spaced from one another along the axial direction.

5. The electric machine of claim 1, wherein the third stator segment is assembled with the first and second stator segments such that the laminations of the third stator segment are arranged at least partially in the gaps between the laminations of the second stator segment.

6. The electric machine of claim 5,
wherein the stator assembly further comprises a fourth stator segment comprising a plurality of laminations extending generally along the circumferential direction,
wherein each pair of adjacent laminations of the fourth stator segment defines a gap therebetween, and
wherein the fourth stator segment is assembled with the first, second, and third stator segments such that the laminations of the third stator segment are also arranged at least partially in the gaps between the laminations of the fourth stator segment.

7. The electric machine of claim 1,
wherein the second stator segment further comprises a backing with the plurality of laminations of the second stator segment coupled to, or formed integrally with, the backing of the second stator segment,
wherein the plurality of laminations of the second stator segment define an angular span about the axial direction, wherein the backing of the second stator segment defines an angular span about the axial direction, and
wherein the angular span of the plurality of laminations of the second stator segment is greater than the angular span of the backing of the second stator segment.

8. The electric machine of claim 1, wherein the first stator segment further comprises
a backing, wherein the second stator segment further comprises a backing,
wherein the first and second stator segments are assembled together such that the backing of the first stator segment is positioned adjacent to the backing of the second stator segment.

9. The electric machine of claim 1,
wherein the first stator segment and the second stator segment are two of a plurality of stator segments of the stator assembly,
wherein each of the plurality of stator segments of the stator assembly comprises a backing, and
wherein the backings of the plurality of stator segments of the stator assembly form a substantially 360 degree stator yoke.

10. The electric machine of claim 1, wherein the stator assembly defines a density greater than about 85 percent.

11. The electric machine of claim 1,
wherein the plurality of laminations of the first stator segment each define a thickness less than about 0.03 inches,
wherein the plurality of laminations of the second stator segment each define a thickness less than about 0.03 inches,
wherein the gaps defined between each pair of adjacent laminations of the first stator segment are each less than about 0.03 inches, and
wherein the gap defined between each pair of adjacent laminations of the second stator segment are each also less than about 0.03 inches.

12. The electric machine of claim 1,
wherein the plurality of laminations of the first stator segment each define a thickness less than or equal to about 0.02 inches,
wherein the plurality of laminations of the second stator segment each define a thickness less than or equal to about 0.02 inches,
wherein the gaps defined between each pair of adjacent laminations of the first stator segment are each less than or equal to about 0.02 inches, and
wherein the gaps defined between each pair of adjacent laminations of the second stator segment are each also less than or equal to about 0.02 inches.

13. The electric machine of claim 1, further comprising:
a rotor assembly rotatable about the axial direction relative to the stator assembly,
wherein the rotor assembly and stator assembly together define an airgap along the axial direction.

14. The electric machine of claim 1,
wherein the first stator segment and the second stator segment are two of a plurality of stator segments of the stator assembly, and
wherein the plurality of stator segments of the stator assembly comprises between three stator segments and twenty stator segments.

15. The electric machine of claim 1,
wherein the plurality of laminations of the first stator segment each comprise an insulation on an outer surface, and
wherein the plurality of laminations of the second stator segment each also comprise an insulation on an outer surface.

16. A method for assembling a stator assembly of an electric machine, the electric machine defining a circumferential direction, an axial direction, and a radial direction, the stator assembly comprising a first stator segment having a plurality of laminations extending generally along the circumferential direction and a second stator segment having a plurality of laminations extending generally along the circumferential direction, the method comprising:
rotating the first stator segment of the stator assembly along the circumferential direction relative to the second stator segment of the stator assembly such that the plurality of laminations of the first stator segment extend at least partially into a plurality of gaps defined between adjacent laminations of the plurality of laminations of the second stator segment;

wherein the stator assembly further comprises a third stator segment comprising a plurality of laminations extending generally along the circumferential direction and a backing, wherein the plurality of laminations of the third stator segment define an angular span about the axial direction, wherein the backing of the third stator segment defines an angular span about the axial direction, wherein the angular span of the plurality of laminations of the third stator segment is less than or substantially equal to the angular span of the backing of the third stator segment, wherein the first stator segment further comprises a backing with the plurality of laminations of the first stator segment coupled to, or formed integrally with, the backing of the first stator segment, wherein the plurality of laminations of the first stator segment define an angular span about the axial direction, wherein the backing of the first stator segment defines an angular span about the axial direction, and wherein the angular span of the plurality of laminations of the first stator segment is greater than the angular span of the backing of the first stator segment.

17. The method of claim 16, further comprising:

moving the third stator segment of the stator assembly along the radial direction such that a plurality of laminations of the third a stator segment extend at least partially into the plurality of gaps between adjacent laminations of the plurality of laminations of the second stator segment.

18. The method of claim 16, further comprising forming the first stator segment using an additive manufacturing process; and forming the second stator segment separately from the first stator segment using an additive manufacturing process.

* * * * *